United States Patent [19]

Nestrick et al.

[11] 4,242,227

[45] Dec. 30, 1980

[54] CHROMATOGRAPHIC COLUMN PACKING HAVING A BONDED ORGANOSILOXANE COATING

[75] Inventors: Terry J. Nestrick; Rudolph H. Stehl, both of Midland, Mich.

[73] Assignee: The Dow Chemical Company, Midland, Mich.

[21] Appl. No.: 62,380

[22] Filed: Jul. 31, 1979

[51] Int. Cl.$^3$ .......................... B01J 31/02; B01J 49/00
[52] U.S. Cl. ............................. 252/428; 252/429 R; 210/656; 210/198.2; 55/67; 55/386
[58] Field of Search ............ 210/31 C, 198 C; 55/67, 55/386; 252/428, 429 R

[56] References Cited

U.S. PATENT DOCUMENTS 3,722,181   3/1973   Kirkland ................................. 55/67

OTHER PUBLICATIONS

Kirkland, J. Chromatogr. Sci., 8, 309, (1970), and 9, 206, (1971).
Locke, J. Chromatogr. Sci., 11, 120–128, (1973).
Aue et al., J. Chromatogr. Sci., 42, 319–335, (1969).
Hastings et al., J. Chromatogr., 60, 329–344, (1971).
Majors et al., J. Chromatogr. Sci., 12, 767–778, (1974).
Grushka et al., Anal. Chem., 49, 1005A–1008A, 1010A, 1012A, (1977).

*Primary Examiner*—John F. Niebling
*Attorney, Agent, or Firm*—Burke M. Halldorson

[57] ABSTRACT

Improved packings for columns useful in gas chromatography are made by a multistep process whereby polysiloxane molecules having various organic substituents are chemically bonded to the surface of a siliceous support. The process comprises one or more cycles of successive reactions with an activated support surface of silicon tetrachloride, an organic dichlorosilane, silicon tetrachloride a second time, a polysiloxane polyol, with intermediate hydrolyses where appropriate to provide reactive terminal silanol groups and a final capping reaction with an organic monochlorosilane. The packing as so prepared is further improved by coating with a conventional stationary phase.

19 Claims, 5 Drawing Figures

CHROMATOGRAPHIC COLUMN PACKING HAVING A BONDED ORGANOSILOXANE COATING

BACKGROUND OF THE INVENTION

This invention concerns improved siliceous packings having chemically bonded polysiloxane coatings for use in gas chromatographic analysis and a process for making these packings. Chromatographic apparatus based on these bonded packings and the analytical methods thereby made possible are also parts of the invention.

The field of chromatographic analysis has expanded rapidly in recent years and many refinements in apparatus, in analytical methods, and in the packings for chromatographic columns have been developed in response to the ever-increasing demand for faster and more sophisticated analyses and the need for differentiating and identifying extremely small concentrations of compounds, some of which may be structurally closely related. As a result of these pressures, many modifications of chromatographic column packing materials have been made to improve their properties. Gas chromatography in which a mixture of a carrier gas and the vapor of a substance to be separated into its individual component compounds is contacted with a chromatographic packing has become increasingly useful. Siliceous supports such as glass beads, silica beads, silica gel, and diatomaceous earth have been physically coated or coated by chemical bonding with various organic materials to deactivate the active surface of the support and to provide more efficient use of the desirable chromatographic properties of the coating material itself.

Aue et al., J. Chromatogr. 42, 319 (1969), Majors et al., J. Chromatogr. Sci. 12, 767 (1974), and Grushka et al., Anal. Chem. 49, 1005A (1977) are representative of many publications in this area of investigation which describe the preparation for chromatographic use of siliceous column packings having siloxane polymer molecules chemically bonded to their surface. These preparations typically are based on the reaction of an acid-activated silica surface with an organopolychlorosilane in solvent solution with water present to cause hydrolysis and polymerization. The terminal hydroxyl groups on the polymer molecules thereby chemically bonded to the silica surface are then inactivated by a capping reaction with trimethylchlorosilane or similar silicon compound. Alternatively, terminal chlorosilyl groups can be inactivated by reaction with an alcohol such as methanol to produce a terminal ether substituent. The bonded products have non-extractable siloxane polymer coatings of up to 5-10 percent by weight and are useful as column packings for chromatographic use. However, these relatively heavy coatings of polymer prepared in this way do not coat the silica surface uniformly and the coated supports do not have the optimum chromatographic properties which are particularly required in gas chromatography.

An improved method has now been discovered by which an active silica or other active siliceous surface can be coated uniformly by a relatively very thin layer of organosiloxane polymer molecules bonded chemically to the surface and covering the surface so as to negate surface activity essentially completely. The bonded product has properties useful in gas chromatography that were not obtainable by previously known methods of preparation.

SUMMARY OF THE INVENTION

It has been found that a column packing having greatly improved gas chromatographic properties is obtained by a particular combination of chemical reactions whereby an acid-activated siliceous surface is rendered capable of having grafted thereto molecules of an organosiloxane polymer polyol, thereby making possible a uniform coating of organosiloxane polymer molecules of similar length and configuration chemically bonded to the siliceous surface. The process that provides this result comprises:

(a) reacting by contacting an acid-activated siliceous surface with SiCl$_4$, thereby causing substantial chlorosilylation of said surface, (b) reacting by contacting the chlorosilylated surface with water vapor until essentially all of the chlorosilyl groups have been hydrolyzed to hydroxysilyl groups, (c) reacting by contacting the hydrolyzed surface with excess dichlorosilane of the formula RR'SiCl$_2$ wherein R and R' each represent a methyl, ethyl, or vinyl radical for a time sufficient to react at least the major proportion of the hydroxysilyl groups to form corresponding disubstituted chlorosilyl groups, (d) reacting by contacting the reacted product of (c) with water vapor until essentially all of the disubstituted chlorosilyl groups have been hydrolyzed to corresponding disubstituted hydroxysilyl groups, (e) reacting by contacting the hydrolyzed product of (d) with SiCl$_4$ for a time sufficient to react substantially all of said disubstituted hydroxysilyl groups to form silyloxy chlorosilyl groups, and (f) reacting by contacting the chlorosilylated product of (e) with a molar excess over said silyloxy chlorosilyl groups of an organosiloxane polymer polyol in the liquid state, said polyol having a molecular weight of at least about 230 and having a molecular structure consisting essentially of repeating units of the formula

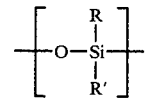

thereby reacting essentially all of said silyloxy chlorosilyl groups with said polyol to form pendant polyol residues having at least one terminal hydroxyl group per residue.

DETAILED DESCRIPTION OF THE INVENTION

Figure 1:
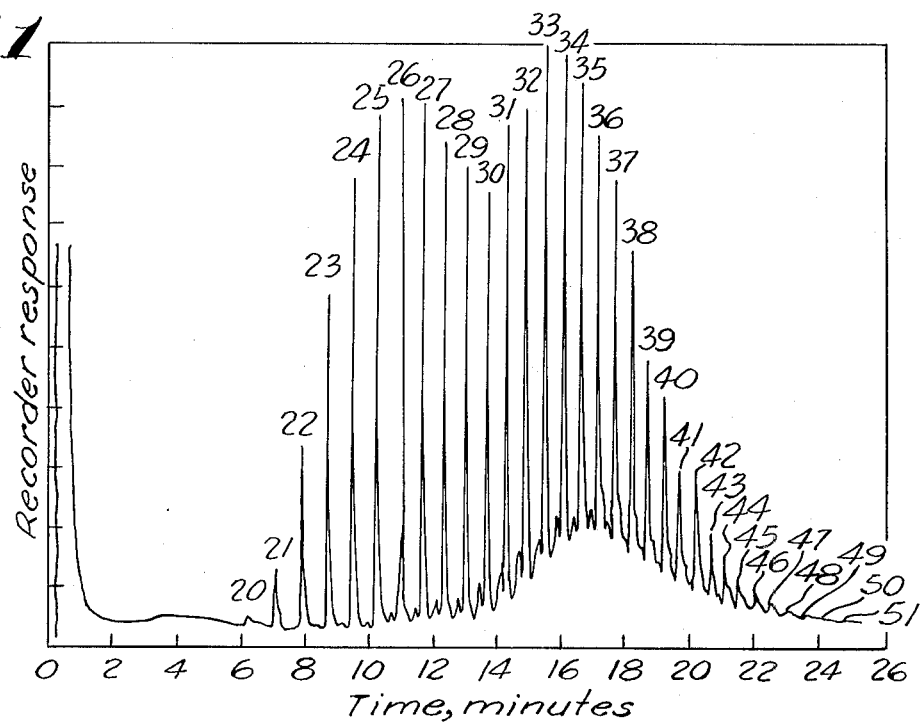
FIGS. 1–5 are plots of the programmed temperature gas chromatographic separations of components in various mixtures of related organic compounds using column packings of the present invention.

The above sequence of reactions (a) through (f) is preferably repeated at least once and most preferably, repeated about 1–4 times to produce a final product where the total organosiloxane polymer coating amounts to about 0.05–1 percent based on the weight of the support.

The terminal hydroxyl groups on the bonded polyol residues after the final polymer reaction step (f) above are preferably inactivated by any of several etherification procedures before the coated support is used for chromatographic analysis. These procedures include the following:

(1) The terminal hydroxyl groups can be reacted directly by contacting the bonded coating with a trimethylsilyl capping reagent such as trimethylsilicon chloride, N,N-bis(trimethylsilyl)acetamide, or hexamethyldisilazane at any convenient temperature. Reaction with gaseous $(CH_3)_3SiCl$ at about 50° C.–275° C. is preferred.

(2) The terminal hydroxyl groups on the pendant polyol residues are preferably reacted with the chlorosilylation reagents $SiCl_4$ and a dichlorosilane of the formula $RR''SiCl_2$ with a hydrolysis step following each reaction using the respective conditions of steps (a), (b), (c), and (d) above and a final etherification or capping reaction as in (1). One or both of the chlorosilylation reaction-hydrolysis combinations may be repeated at least once and the order of reactions may be reversed, i.e., (c)-(d)-(a)-(b), prior to the capping reaction. In the dichlorosilane reagent $RR''SiCl_2$, R is as previously defined and R'' represents R, phenyl, 2-cyanoethyl, 3-cyanopropyl, 3,3,3-trifluoropropyl, or other such hydrocarbon or substituted hydrocarbon radical. The R and R'' substituents can be varied as desired to obtain particular polarity characteristics at the free ends of the bonded polymer molecules which serve as the working stationary phase of the coated support and the finished packing is thereby adapted for optimum efficiency in different chromatographic separations.

The reactions with $SiCl_4$, steps (a) and (e) in the process outlined above, can be carried out with either liquid silicon tetrachloride, conveniently in inert solvent solution, or with the gaseous reagent, preferably as mixed with nitrogen or other inert gas. Reaction with the liquid chloride is subject to practical temperature limitations and is usually carried out at about 0° C.–50° C. The preferred reaction with $SiCl_4$ vapors is faster and more complete and a wider range of reaction temperature is available in practice, for example, a range of about 100° C.–275° C. is preferred for this mode although any convenient temperature within a broad range of about 0° C.–300° C. can be used effectively.

Step (c) above, the reaction of $RR'SiCl_2$ with the hydrolyzed chlorosilylated surface, is also preferably run using vapors of the organosilicon dichloride, for example, mixed with an inert carrier or diluent gas such as nitrogen. The other reactions involving a vapor phase reagent, i.e., the hydrolysis steps and the reactions with $SiCl_4$ are also preferably run in this way, for example, by bubbling nitrogen through the liquid reagent at an appropriate temperature and passing the vapor-laden gas through a tube containing a permeable bed of the particulate support.

Step (c) can also be run using the liquid organosilicon dichloride, preferably in an inert solvent solution. The siloxane polymer reaction in Step (f) is also run in this fashion and the optional reaction with organosilicon dichlorides described in (2) above usually is run this way because the vapor pressure of the reagent may preclude a gas phase reaction. Inert solvents suitable for use in these liquid phase reactions include the common hydrocarbon and chlorinated hydrocarbon solvents which are inert under process conditions to silicon chlorides and the HCl by-product. Such reactions using a solvent solution of a siloxane polymer or an organic silicon chloride are preferably run by passing the solution through the bed of support at a temperature in the low part of the range specified, then raising the temperature gradually to a middle or higher part of that range to remove the solvent by a flow of inert gas and to complete the reaction. Excess unreacted polymer or silicon chloride can be removed by flushing with solvent.

In general, the reactions of $SiCl_4$ or an organochlorosilane with hydroxyl groups, the reaction of an organosiloxane polymer polyol with a chlorosilylated product, or the hydrolysis of a chlorosilylated product with water vapor all take place at some rate at any temperature where the silicon chloride, polyol, or water vapor reactant can be contacted in gaseous or liquid state as appropriate with reactive surface-bound radicals so long as the temperature is below that where thermal decomposition occurs. Therefore, temperatures for these reactions are limited only by practical considerations.

Broad practical and narrower preferred temperature ranges for the various steps listed above are as follows:

For the reactions with $SiCl_4$, about 0° C.–300° C. and for the preferred gaseous $SiCl_4$ reaction, about 100° C.–275° C.

For the various hydrolysis reactions, about 0° C.–250° C., preferably about 25° C.–200° C.

For the reactions with $RR'SiCl_2$ and $RR''SiCl_2$, about 0° C.–250° C., preferably about 25° C.–200° C.

For the reaction with siloxane polymer, about 0° C.–300° C., preferably about 100° C.–275° C.

For the reaction with $(CH_3)_3SiCl$ or other capping reagent, about 0° C.–300° C., preferably about 50° C.–275° C.

The surface-activated siliceous supports specified for use with this process are those conventionally used in the art for similar bonding procedures, a silica or other siliceous solid which has been exposed to liquid or gaseous strong acid such as hydrochloric acid or nitric acid to increase the proportion of hydroxyl groups chemically bonded to silicon atoms at the solid surface. Such surface-activated materials are thereby provided with an optimum number of reactive sites to which molecules of the desired coating can be chemically bonded.

Organosiloxane polymers of any molecular weight can be used in the preparation, i.e., from a minimum of 166 which represents the dimer having two dimethylsiloxane units to high molecular weight polymers having hundreds or thousands of siloxane units per molecular. Polymers having an average molecular weight in the approximate range of 1,000–20,000 are preferred.

Siloxane polymers as defined above are available commercially, particularly the preferred polydimethylsiloxane of which the molecular structure consists essentially of repeating dimethylsilyloxy units. These polymers ordinarily have more than two hydroxyl groups per molecule, indicating that their molecular structure is branched to some degree, thus departing from the theoretical linearity.

In order to maximize the number of the relatively bulky polymer molecules that can be bonded to a unit of surface area, it is usually desirable to repeat at least once the combination of steps (c) and (d) above, i.e., the reaction of RR'SiCl₂ and subsequent hydrolysis following the initial chlorosilylation of the surface with SiCl₄. The repeated steps (c) and (d) are advantageously overlapped to a degree by contacting the hydrolyzed chlorosilylated surface with the RR'SiCl₂ reagent in the presence of a small amount of water, thereby causing some hydrolysis and polymerization along with the reaction of the organic silicon dichloride with the surface bound hydroxyl groups. This can be done by passing wet nitrogen through or by the liquid silicon dichloride to contact the treated siliceous support. In this way, relatively short siloxane polymer molecules with terminal hydroxyl groups bonded to the support surface are formed prior to the second chlorosilylation reaction with SiCl₄. The subsequent reaction with the terminal hydroxyl groups on those siloxane polymer molecules in step (f) is thereby moved farther from the siliceous surface and so is less subject to hindrance of the reaction by that surface.

The surface-bonded polysiloxane coatings prepared by this process maintain the general chemical characteristics of unbonded silicone polymers as stationary phases. Thus, the chromatographic column packings described herein have a high degree of thermal stability and possess an extended operational temperature range up to about 300° C. They are highly resistant to hydrolysis, are inert to most chromatographable substances, and show very low "bleed" of the stationary phase. The extremely thin, uniform film thickness of the bonded coating offers high chromatographic efficiency with a wider spectrum of analyzable compounds and reduced analysis times as compared to previously known chromatographic column packings.

These packings are further versatile in that they can be modified easily by light coatings of very polar to very non-polar conventional stationary phases without significant sacrifice of efficiency. In this preferred modification and use of the packings of this invention, these silicone-bonded packings serve essentially as very inert supporting materials. By the choice of an appropriate conventional stationary phase to coat on these bonded packings, the resulting modified packing is thereby tailored to a specific analytical application for maximum efficiency. Such physically bound coatings can be applied by conventional means for coating conventional supports. Ordinarily, this is accomplished by applying a solution of the coating in an inert solvent of relatively low boiling point and evaporating the solvent from the wetted support. Solvents such as benzene, toluene, methanol, acetone, chloroform, and methylene chloride are examples of solvents commonly used for the purpose. Illustrative stationary phases are the organic polymers conventionally used in chromatography such as polyalkylene glycols, polyamides, polyphenyl ether, polyphenyl sulfone, and organosiloxane polymers. Mixtures of two or more of these can also be used. A relatively small amount of stationary phase is usually applied, for example, about 0.1–5 percent based on the weight of support. A coating concentration of about 0.2–1 percent is preferred.

Both the bonded silicone packings and those having an added coating of stationary phase as described above provide fast and accurate chromatographic determinations in applications such as quality control of commercial chemical products by analysis for impurities, in pollution control by determination of trace amounts of polyhalogenated aromatic compounds in water, and in refinery operations where rapid determination of boiling range and identification of components of petroleum fractions facilitate process control.

EXAMPLE 1

The reaction apparatus was an all glass assembly wherein the reactor was a 15 mm I.D. ×700 mm Pyrex glass tube heated by an electrical clamshell furnace and connected to a source of nitrogen. The diatomaceous earth support to be treated formed a bed held in place within the reactor tube by glass wool plugs. Volatile reactants were carried by the nitrogen stream through the bed and were supplied by means of one or both of a bubbler flask containing the liquid reactant and connected to the reactor by three-way stopcocks and an insert in the heated forepart of the reactor tube consisting of a section of glass tubing containing a plug of glass wool wet with the volatile reactant. For solvent extraction or reaction of the diatomite bed with a nonvolatile reactant, the reactor tube was turned on end and solvent or solvent solution of reactant was dripped into the diatomite bed, the liquid flow into and through the bed being assisted by nitrogen pressure of less than one atomsphere. Subsequent nitrogen flow and heating removed the solvent and completed the reaction.

A portion of 80–100 mesh Chromosorb W, a diatomaceous silica specially processed by Johns-Manville Corp. for chromatographic use, was extracted for about 12 hours in a Soxhlet apparatus with constant boiling hydrochloric acid, then was thoroughly washed successively with water, methanol, and methylene chloride and finally was air dried. A 20 g portion of this material was put in the tube reactor and the silica surface was further activated by first passing about 45 ml/min. nitrogen through the silica bed while raising the temperature in 40° C. steps to 200° C. in about 40 minutes, then essentially saturating the incoming nitrogen with HCl and water vapor by passing it through a bubbler flask containing concentrated hydrochloric acid. The HCl-saturated nitrogen stream was continued for 1.5 hours at 200° C., then the bubbler was bypassed and the bed was purged with pure nitrogen for 15 minutes while the temperature was reduced to 150° C. A succession of reaction and purge steps was then conducted as summarized in the following table. Except for the solution reactions and solvent extractions noted below, the nitrogen flow remained at 45 ml/min. whether pure for a purge or containing reactant vapor from the bubbler, saturated glass wool, or both. Where a temperature range is given, the first temperature indicates the initial temperature of the time period for that step and the second temperature given is the final temperature of that period.

TABLE 1

| Time Min. | Treatment or Reactant | Temp. °C. |
|---|---|---|
| 30 | SiCl₄ | 150 |
| 30 | H₂O | 150–ambient |
| 40 | (CH₃)₂SiCl₂ | ambient–150 |
| 20 | H₂O | 150–ambient |
| 15 | (CH₃)₂SiCl₂ | ambient |
| 20 | (CH₃)₂SiCl₂ + H₂O[1] | ambient–150 |
| 15 | N₂ purge | 150 |
| 20 | SiCl₄ | 150 |
| 25 | N₂ purge | 150–ambient |
| 35 | 0.5 g. polydimethylsiloxane[2] in 65 ml CH₂Cl₂ | ambient–230 |
| 20 | SiCl₄ | 230–150 |
| 35 | H₂O | 150–ambient |
| 15 | (CH₃)₂SiCl₂ | ambient |

TABLE 1-continued

| Time Min. | Treatment or Reactant | Temp. °C. |
|---|---|---|
| 15 | $(CH_3)_2SiCl_2 + H_2O$[1] | ambient-150 |
| 30 | $N_2$ purge | 150 |
| 30 | $SiCl_4$ | 175 |
| 15 | $N_2$ purge | 175-ambient |
| 25 | 0.5 g polydimethyl-siloxane[2] in 65 ml $CH_2Cl_2$ | ambient-230 |
| 25 | $SiCl_4$ | 230-150 |
| 25 | $H_2O$ | 150-ambient |
| 20 | $(CH_3)_2SiCl_2$ | ambient |
| 20 | $(CH_3)_2SiCl_2 + H_2O$[1] | ambient-150 |
| 15 | $N_2$ purge | 150 |
| 20 | $SiCl_4$ | 150 |
| 10 | Purge | 150-ambient |
| 45 | 0.5 g polydimethyl-siloxane[2] in 65 ml $CH_2Cl_2$ | ambient-275 |
| 25 | $SiCl_4$ | 275-150 |
| 20 | $H_2O$ | 150-ambient |
| 20 | $(CH_3)_2SiCl_2$ | ambient |
| 15 | $(CH_3)_2SiCl_2 + H_2O$ | ambient-150 |
| 15 | $H_2O$ | 150 |
| 15 | $N_2$ purge | 150-230 |

[1] The nitrogen stream was first bubbled through water and then passed through glass wool wet with $(CH_3)_2SiCl_2$.
[2] Polydimethylsiloxane with terminal hydroxyl groups, viscosity at 25° C. = 50 centistokes. This polymer had an average molecular weight of about 3000 with about four hydroxyl groups per molecule, indicating some degree of branching in its structure.

The reactor was cooled to ambient temperature at this point and the bed of treated silica was removed and washed with acetone and chloroform to remove bulk polymer. It was then air dried, screened through a 60 mesh screen and put back into the reactor tube. The reactor was then heated to 230° C. with nitrogen passing through.

| Time Min. | Treatment or Reactant | Temp. °C. |
|---|---|---|
| 55 | $(CH_3)_3SiCl$ | 230 |
| 20 | $N_2$ purge | 230-270 |

The reactor was then cooled and the treated silica was removed and used to pack a chromatographic column for evaluation.

Example 2 describes the preparation by the same general procedure of a bonded silicone packing in which the polydimethylsiloxane molecular chains bonded to the silica surface are grafted to polysiloxane molecules having both methyl and 2-cyanoethyl substituents.

EXAMPLE 2

The apparatus of Example 1 was used to treat a 21.7 g portion of Chromosorb W by the same general bonding procedure. The Chromosorb W was first given the acid treatments described in Example 1.

TABLE 2

| Time Min. | Treatment or Reactant | Temp. °C. |
|---|---|---|
| 25 | $SiCl_4$ | 150 |
| 30 | $H_2O$ | 150-ambient |
| 15 | $(CH_3)_2SiCl_2$ | ambient |
| 15 | $(CH_3)_2SiCl_2 + H_2O$ | ambient-150 |
| 20 | $H_2O$ | 150-ambient |
| 20 | $(CH_3)_2SiCl_2$ | ambient |
| 20 | $(CH_3)_2SiCl_2 + H_2O$ | ambient-150 |
| 15 | $N_2$ purge | 150-180 |
| 20 | $SiCl_4$ | 180 |

TABLE 2-continued

| Time Min. | Treatment or Reactant | Temp. °C. |
|---|---|---|
| 5 | $N_2$ purge | 180-ambient |
| 50 | 0.5 g polydimethyl-siloxane[1] in 75 ml $CH_2Cl_2$ | ambient-230 |
| 15 | $SiCl_4$ | 230-150 |
| 35 | $H_2O$ | 150-ambient |
| 15 | $(CH_3)_2SiCl_2$ | ambient |
| 20 | $(CH_3)_2SiCl_2 + H_2O$ | ambient-150 |
| 15 | $N_2$ purge | 150 |
| 10 | $SiCl_4$ | 150 |
| 10 | $N_2$ purge | 150-ambient |
| 70 | 0.5 g polydimethyl-siloxane[1] in 75 ml $CH_2Cl_2$ | ambient-230 |
| 30 | $SiCl_4$ | 150 |
| 30 | $H_2O$ | 150-ambient |
| 15 | $(CH_3)_2SiCl_2$ | ambient |
| 25 | $(CH_3)_2SiCl_2 + H_2O$ | ambient-150 |
| 20 | $N_2$ purge | 150 |
| 30 | $SiCl_4$ | 150 |
| 5 | $N_2$ purge | 150-ambient |
| 55 | 0.5 g polydimethyl-siloxane[1] in 75 ml $CH_2Cl_2$ | ambient-250 |
| 30 | $H_2O$ | 250-150 |
| 60 | solvent flush using acetone, toluene, and then chloroform to remove bulk polymer, dried at 50° C. with 200 ml/min. $N_2$ | ambient-50 |
| 15 | 1 g $CH_3(CNCH_2CH_2)SiCl_2$ in 75 ml $CH_2Cl_2$ | ambient-150 |
| 40 | $H_2O$ | 150-200 |
| 15 | $N_2$ purge | 200 |
| 20 | $SiCl_4$ | 200 |
| 25 | $H_2O$ | 200-ambient |
| 30 | 1 g $CH_3(CNCH_2CH_2)SiCl_2$ in 75 ml $CH_2Cl_2$ | ambient-150 |
| 30 | $H_2O$ | 150-200 |
| 15 | $N_2$ purge | 200-250 |
| 15 | $SiCl_4$ | 250-200 |
| 50 | $H_2O$ | 200-ambient |
| 10 | 1 g $CH_3(CNCH_2CH_2)SiCl_2$ in 75 ml $CH_2Cl_2$ | ambient-90 |
| 55 | $H_2O$ | 90-200 |
| 15 | $N_2$ purge | 200-250 |
| 60 | solvent flush as above, dried under $N_2$ at 40° C. | ambient |
| 15 | $N_2$ purge | 40-230 |
| 30 | $(CH_3)_3SiCl$ | 230 |
| 30 | $N_2$ purge | 230-250-ambient |

[1] The polydimethylsiloxane with terminal hydroxyl groups used in Example 1.

The treated packing was screened through a 60 mesh screen to remove lumps and then was used to pack a chromatographic column for evaluation.

The bonded packings prepared as described in Examples 1 and 2 were packed in 2 mm I.D.×180 cm glass columns for chromatographic testing. The glass columns were preconditioned by rinsing successively with methylene chloride, methanol, acetone, water, concentrated hydrochloric acid (allowed to stand for about ten minutes), water, acetone, methanol, methylene chloride, and air dried. They were then filled with about 20 percent by volume dimethyldichlorosilane in toluene, allowed to stand for about 15 minutes, then rinsed with methanol followed by methylene chloride, and air dried. The columns thus preconditioned were packed using several cycles of vibration followed by gentle suction to obtain maximum bed settling. The packed column was installed in a commercially available gas chromatograph, flushed with helium at room temperature for 15 minutes, then heated to 300° C. at a rate of 10° C. per minute for the packing products of Examples 1 and 2, and maintained at 300° C. for 4 hours before use with a flow of 35 ml/min. of helium.

These packings proved to be easily stable to extended operation at 350° C. and provided outstanding gas chromatographic test results with high efficiency and improved retention. FIG. 1 is a chromatogram showing the separation of n-alkanes ranging from about $C_{20}$ to $C_{51}$ using the packing product of Example 1. The sample was candle wax in isooctane. A Varian 1400-FID (flame ionization detector) chromatograph was used. The column was temperature programmed at 8° C. per minute from 100° C. to 350° C. using helium as carrier gas at 30 ml/min.

Figure 2:
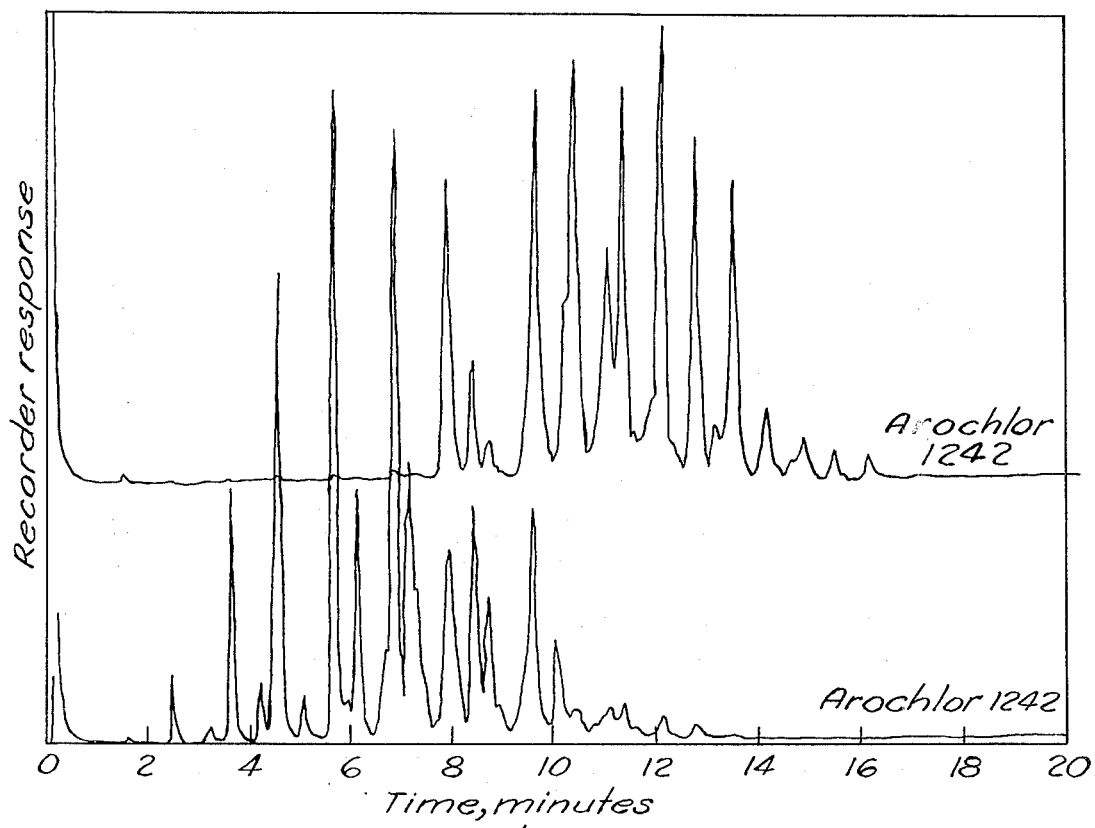

FIG. 2 represents overlaid chromatograms of two samples of polychlorobiphenyl using a similar column packed with the product of Example 2. These chromatograms were obtained in the same way with a temperature program of 6° C. per minute from 120° C. to 250° C.

EXAMPLE 3

Another portion of Chromosorb W was treated with hydrochloric acid and washed as described in Example 1. The treated silica was then reacted with $SiCl_4$, a dichlorosilane, and the polydimethylsiloxane with intermediate hydrolyses and final capping with $(CH_3)_3SiCl$ essentially as shown in Example 1 with the exception that the dichlorosilane used was methylvinylsilicon dichloride instead of dimethylsilicon dichloride. In this way, a bonded silicone packing was obtained in which some of the methyl groups in the polydimethylsiloxane molecular chains bonded to the silica had been replaced by vinyl groups. This material had chromatographic characteristics essentially the same as those of the all methyl-substituted product of Example 1.

EXAMPLE 4–7

Portions of the bonded polydimethylsiloxane product of the process of Example 1 were wet with chloroform solutions of various polymers and dried to obtain coated packings which were used for chromatographic detection of traces of halogenated aromatic contaminants in environmental samples.

| Example No. | Coating, wt. % | Halogenated Contaminant |
|---|---|---|
| 4 | polyphenyl sulfone 0.6% | chlorinated dibenzo-p-dioxins |
| 5 | polyphenyl sulfone 0.4% methylphenyl polysiloxane 0.6% | chlorinated dibenzo-p-dioxins |
| 6 | poly(m-phenyl)ether 0.6% | chlorinated dibenzo-p-dioxins |
| 7 | Dexsil 300[1] silicone 0.75% | polybrominated biphenyl |

[1]A meta-substituted carborane-polymethylsiloxane made by Dexsil Corporation.

Figure 3:
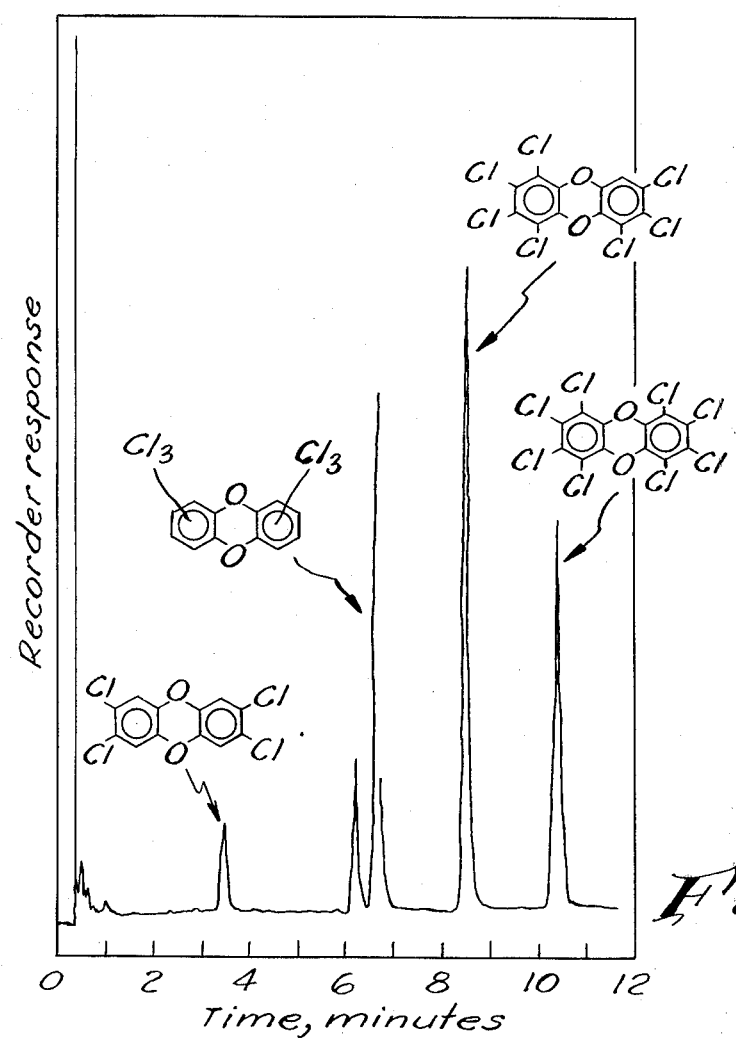
Figure 4:
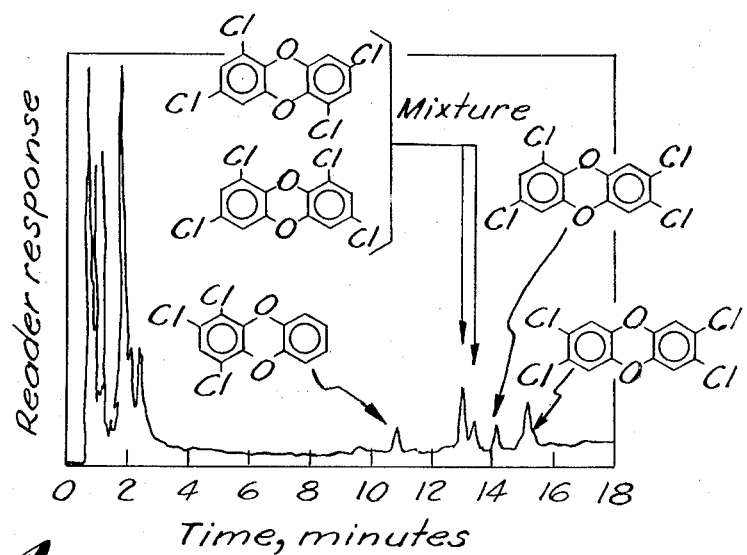
Figure 5:
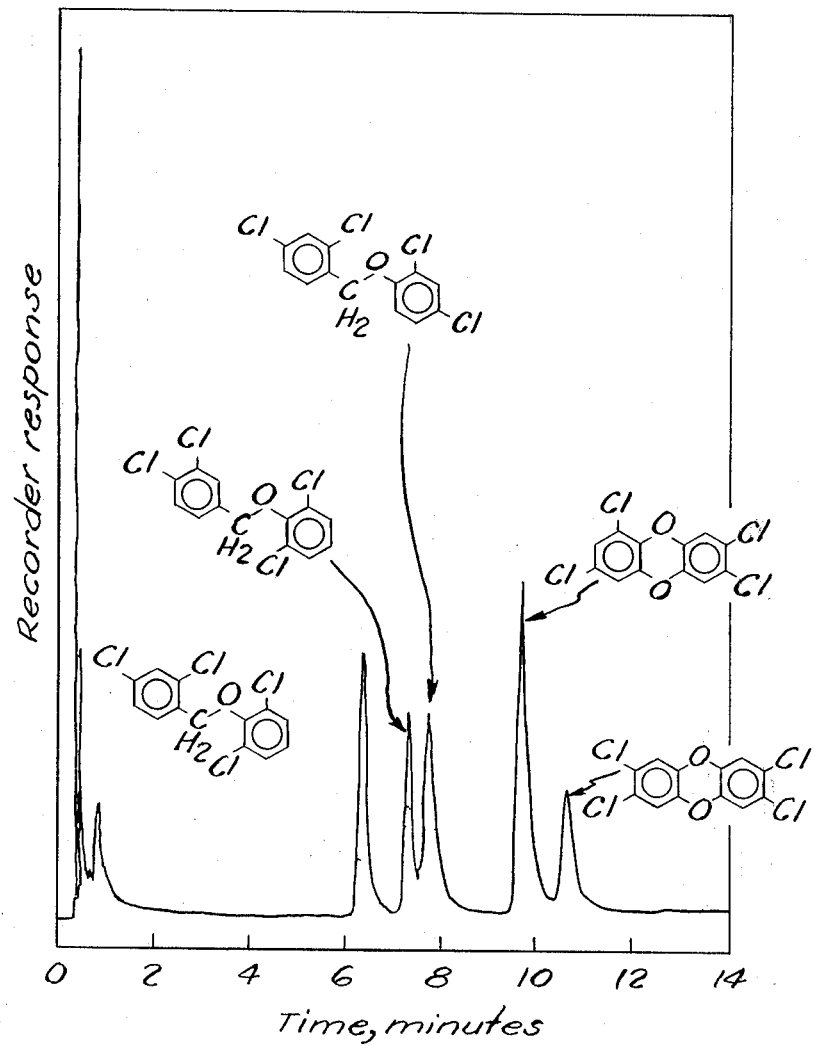

FIGS. 3–5 are chromatograms obtained in Examples 4–6 showing various polychlorodibenzo-p-dioxins detected as well as some other related compounds. These chromatograms were obtained using a Varian 3700 chromatograph with a $Ni^{63}$ electron capture detector and nitrogen as the carrier gas with other conditions similar to those in Examples 1 and 2.

EXAMPLE 8

A portion of the bonded polysiloxane product of Example 2 wherein the bonded silicone molecules had some 2-cyanoethyl substituents in addition to the methyl groups was coated with 0.5 percent by weight of Silar 10C, a poly(3-cyanopropyl) silicone made by Silar Laboratories, by the technique described in Examples 4–7. The dried coated packing was used for accurate chromatographic determination of traces of chloromethyl methyl ether and bis(chloromethyl) ether in various media by the methods previously described.

We claim:

1. In a process for making a chromatographic column packing by chemically bonding a siloxane polymer coating to the surface of a siliceous solid, the improvement which comprises the combination of steps:
   (a) reacting by contacting an acid-activated siliceous surface with $SiCl_4$, thereby causing substantial chlorosilylation of said surface,
   (b) reacting by contacting the chlorosilylated surface with water vapor until essentially all of the chlorosilyl groups have been hydrolyzed to hydroxysilyl groups,
   (c) reacting by contacting the hydrolyzed surface with excess dichlorosilane of the formula $RR'SiCl_2$ wherein R and R' each represent a methyl, ethyl, or vinyl radical for a time sufficient to react at least the major proportion of the hydroxysilyl groups to form corresponding disubstituted chlorosilyl groups,
   (d) reacting by contacting the reacted product of (c) with water vapor until essentially all of the disubstituted chlorosilyl groups have been hydrolyzed to corresponding disubstituted hydroxysilyl groups,
   (e) reacting by contacting the hydrolyzed product of (d) with $SiCl_4$ for a time sufficient to react substantially all of said disubstituted hydroxysilyl groups to form silyloxy chlorosilyl groups, and
   (f) reacting by contacting the chlorosilylated product of (e) with a molar excess over said silyloxy chlorosilyl groups of a siloxane polymer polyol in the liquid state, said polyol having a molecular weight of at least about 230 and having a molecular structure consisting essentially of repeating units of the formula

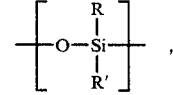

thereby reacting essentially all of said silyloxy chlorosilyl groups with said polyol to form pendant polyol residues having at least one terminal hydroxyl group per residue.

2. The process of claim 1 wherein the sequence of steps (a) through (f) is repeated from one to about four times.

3. The process of claim 2 wherein steps (a) and (e) are run using gaseous $SiCl_4$ at about 0° C.–300° C., the hydrolyses in steps (b) and (d) are run with water vapor at about 0° C.–250° C., the reaction with $RR'SiCl_2$ in step (c) is run at about 0° C.–250° C., and the polymer polyol reaction in step (f) is run at about 0° C.–300° C.

4. The process of claim 2 wherein following the final sequence of steps (a) through (f), the product of the final step (f) is reacted by contacting with a trimethylsilyl capping reagent, thereby etherifying essentially all of the terminal hydroxyl groups on the pendant polyol residues with trimethylsilyl groups.

5. The process of claim 2 wherein the product of the final step (f) is reacted in any alternating order at least once with each of the chlorosilylation reagents $SiCl_4$ and $RR''SiCl_2$ where $R''$ is R, phenyl, 2-cyanoethyl, 3-cyanopropyl, or 3,3,3-trifluoropropyl, each such chlorosilylation reaction followed by a hydrolysis step, said chlorosilylation reactions and said hydrolysis steps carried out as defined in steps (a), (c), and (b) respectively, and the final hydrolyzed product thereof is reacted at about 0°–300° C. with a trimethylsilyl capping reagent.

6. The process of claim 5 wherein the capping reagent is gaseous $(CH_3)_3SiCl$ and the capping reaction is carried out at about 50° C.–275° C.

7. The process of claim 6 wherein R, R' and R'' each represent a methyl group.

8. The process of claim 6 wherein R and R' each represent a methyl group and R'' is a 2-cyanoethyl group.

9. The process of claim 6 wherein R and R' each represent a methyl group and R'' is a vinyl group.

10. The process of claim 4 wherein the trimethylsilyl-capped product is coated with about 0.1–5 percent by weight of at least one polymeric organic stationary phase.

11. A chromatographic column packing consisting essentially of the product of the process of claim 4.

12. A chromatographic column packing consisting essentially of the product of the process of claim 7.

13. A chromatographic column packing consisting essentially of the product of the process of claim 8.

14. A chromatographic column packing consisting essentially of the product of the process of claim 9.

15. A chromatographic column packing consisting essentially of the product of the process of claim 10.

16. The product of claim 15 wherein the polymeric organic stationary phase is a polyphenyl sulfone.

17. The product of claim 15 is wherein the polymeric organic stationary phase is a polyphenyl ether.

18. The product of claim 15 wherein the polymeric organic stationary phase is an organopolysiloxane.

19. The product of claim 15 wherein the polymeric organic stationary phase is a mixture of a polyphenyl sulfone and an organopolysiloxane.

* * * * *